United States Patent Office
3,222,997
Patented Dec. 14, 1965

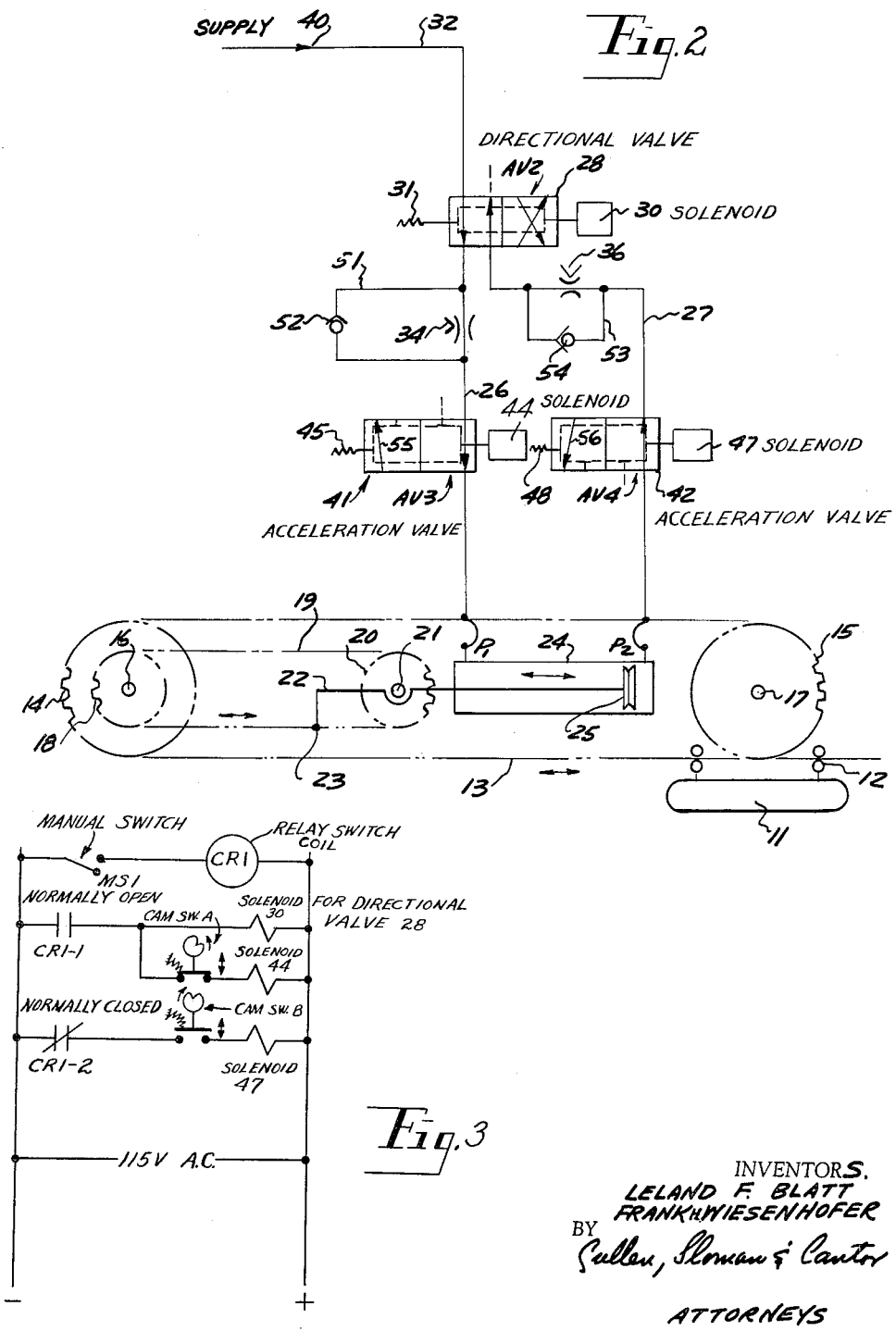

3,222,997
PNEUMATIC CONTROL SYSTEM
Leland F. Blatt, 24121 Mound Road, Grosse Pointe, Mich., and Frank H. Wiesenhofer, 24252 Lexington Ave., East Detroit, Mich.
Filed May 27, 1963, Ser. No. 283,157
1 Claim. (Cl. 91—407)

The present invention relates to a pneumatic control system for the feeding of machine tool elements, and more particularly to a series of remote control valves for regulating the flow of pressure fluid to opposite ends of a cylinder for effecting reciprocal feeding movements of such machine tool element.

Since the kinetic energy of a moving mass is directly proportional to the square of the velocity, it is readily seen that in any moving mechanical device, velocity is the largest single energy contributing factor. Therefore, in the feeding of work, and before the end of a mechanical motion, the velocity of a mass must be gradually decreased to effect a smooth mechanical stop.

Accordingly, it is an object of the present invention to provide a pneumatic control system which will satisfy the following requirements:

1. Must rapidly feed air energy to accelerate the machine masses to the required controlled velocity, within the desired cycle time.

2. Must rapidly decelerate the machine masses to a smooth rest or normal position. During the deceleration part of the cycle, the excess kinetic energy must be absorbed in the desired period of time without allowing the force created by the moving mass to create a higher compression in the air power cylinder, than the incoming line pressure can effect on the opposite side of the cylinder piston area. Thus, as the compression ratio rises a smooth rest will be increasingly difficult to control.

These and other objects will be seen in the following specification and claims in conjunction with the appended drawings in which:

FIG. 2 is a similar view showing a variation in the arrangement of the control valves in the control system.

FIG. 3 is a schematic wiring diagram.

Figure 1:
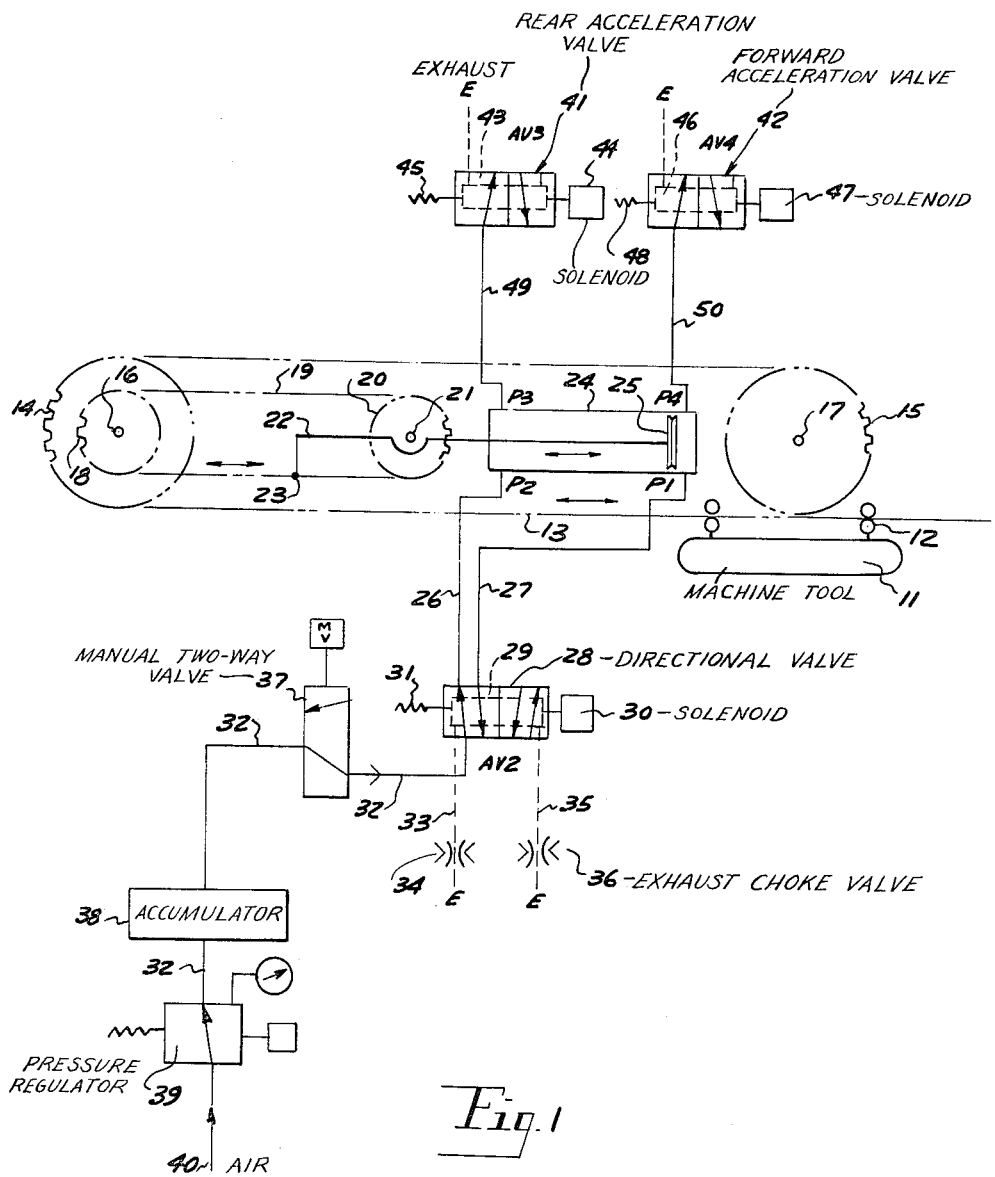
FIG. 1 is a schematic diagram of the present pneumatic control system showing a cylinder for pneumatically moving a mass in two directions and connected therewith a series of control valves and a fluid pressure source.

It will be understood that the above drawings illustrate merely a preferred embodiment of the invention and that other embodiments are contemplated within the scope of the claims hereafter set forth.

Referring to FIG. 1 the mass to be reciprocally moved is generally indicated at 11, and schematically represents any machine tool as, for example, a jaw and related mechanism for gripping a work piece such as a stamped part to be inserted and/or removed from a press. Mass 11 is mounted at 12 upon a suitable guide support for reciprocal movements and is connected with the reciprocally movable sprocket chain 13, for illustration, which extends around sprockets 14 and 15, respectively journaled at 16 and 17.

Driven sprocket 18, secured to shaft 16, is interconnected with idler sprocket 20 by sprocket chain 19. Reciprocal piston rod 22 joined at 23 to chain 19, extends into pneumatic cylinder 24, and upon the interior end thereof mounts piston 25, said cylinder at its opposite ends being provided with ports P–1, P–2, P–3 and P–4.

*Directional control valve*

Delivery and exhaust conduits 26, 27 at their one ends join opposite ends of cylinder 24 at ports P–1 and P–2, their other ends being joined to directional control valve 28, schematically shown, whose movable spool 29 is spring-biased at one end at 31 and its other end connected with solenoid 30 for regulating the flow of pressure fluid outwardly either through conduit 26 or 27 and with exhaust returning through the other conduit.

The fluid pressure supply line 32 delivers pressure fluid to directional valve 28 from the manual two-way valve 37 which is connected to a suitable accumulator 38 schematically shown. The accumulator is supplied air under pressure from a source 40 which is directed through pressure regulator 39 for establishing a constant pressure condition within said accumulator. Directional valve 28 has a pair of exhaust ports which through conduits 33 and 35 respectively connect with exhaust choke valves 34 and 36, schematically shown, being a means for metering exhaust fluids returned to the directional valve through either of conduits 26 or 27.

*Rear acceleration valve*

Conduit 49 interconnects exhaust port P–3 of cylinder 24 with rear acceleration valve 41, schematically shown, whose reciprocal spool 43 is normally spring-biased in one direction by spring 45 and controlled for movement in the opposite direction by solenoid 44. Said spool is normally positioned by its spring, FIG. 1, to prevent exhausting of fluids through outlet E.

*Forward acceleration valve*

Conduit 50 connects port P–4 at the opposite end of cylinder 24 with the forward acceleration valve 42, whose reciprocally movable spool 46 is biased in one direction by spring 48 and controlled for movement in the opposite direction by solenoid 47. In the normal positioning of spool 46 exhaust fluid to exhaust outlet E is normally blocked. For simplicity the present directional control valve 28 may be hereafter referred to as valve AV2, rear acceleration valve as AV3, forward acceleration valve as AV4.

Valve AV2 in the illustrative embodiment is a four-way five port directional valve. Here, a five port valve is desirable due to the two exhaust ports with connected choke valves 34 and 36 for metered control of exhaust from both ends of double acting shuttle type of cylinder 24.

All three valves may be controlled by single or double solenoids or by a pilot function. While acceleration valves AV3 and AV4 are schematically shown as three-way valves, in both of these instances a two-way "on" and "off" valve would suffice since this is a pneumatic system and exhaust is delivered directly to atmosphere.

*Operation*

In FIG. 1 the system is shown in a rest position, main cylinder rod 22 being retracted with port P–2 pressurized by AV2, port 1 being open to exhaust. To initiate operation, and after the fluid pressure supply is made available through control of manual valve 37 at, for example, a pressure of eighty pounds per square inch, directional valve AV2 and acceleration valve AV3 are simultaneously activated by remote control. AV2 feeds line pressure to port P–1 and exhausts air from port P–2 back to AV2 and through the choke valve 34.

At the same time, AV3 has been actuated through a suitable relay switch energizing solenoid 44 and moving the spool 43 permitting free exhausting of air from port P–3 through exhaust E to the atmosphere with no choke restriction. This allows the full effect of the incoming line pressure at P–1 to act on piston 25. Said piston and its connected mass 11 which may be a machine tool or a movable part thereon such as a jaw arm for gripping a work piece, starts to accelerate. At a predetermined point, approximately one-half the stroke of piston 25, a suitable limit or other switch is activated deenergizing solenoid 44. Spring-bias 45 on spool 43 changes its position so as to block port P–3 and directing exhaust fluid to AV2.

Now as piston 25 continues to move with mass 11, pressure builds up against the rod side of said piston being exhausted through port P–2, conduit 26 and AV2 and metered out through choke valve 34 to thus absorb the excess kinetic energy of the moving mass to bring the mass to a smooth stop at the end of the cylinder stroke. The point at which AV3 is automatically closed, coupled with the proper adjustment of choke valve 34, allows considerable circuit adjustment for a variety of mass loads.

At the end of the cylinder stroke, four-way directional valve AV2 is shifted back to its normal position. This is accomplished by a switch means which deactivates solenoid 30 so that the spring-bias 31 repositions spool 29 so that line pressure from conduit 32 is now delivered to port P–2 of cylinder 24 which is exhausted through port P–1 back through AV2 and corresponding choke valve 36.

Simultaneously with this reverse of AV2, the forward acceleration valve AV4 is shifted by remote control energizing solenoid 47 against the action of spring-bias 48 so that the spool 46 is moved opening port P–4 to exhaust E to the atmosphere.

The cylinder rod 22 and connected mass 11 is accelerating toward the forward position shown in FIG 1 since there is no restriction to the exhausting of fluid at port P–4. At a predetermined point such as approximately mid-way of the stroke of the movable portion of the machine tool, a suitable limit switch or other switch is activated for deenergizing solenoid 47. Spool 46 reverses under the action of spring 48 blocking further exhaust flow from port P–4. Pressure is now building up behind the blind end of piston 25 and is being exhausted to conduit 27 through AV2 and the corresponding choke valve 36 to thus absorb the excess kinetic energy to bring the mass to a smooth stop at the rest position.

Modified control system

An alternate method of accomplishing the same result with a slightly different arrangement of connections is shown in FIG. 2, wherein the corresponding parts relative to FIG. 1 have been numbered the same and their description is not repeated. Here the pressure fluid under a predetermined pressure from a suitable accumulator is delivered through conduit 32 to the directional control valve AV2 as above described. This pressure fluid is delivered through bi-pass 51 and one-way ball check valve 52 around choke valve 34 and through the normally opened acceleration control valve 41 corresponding to AV3 of FIG. 1 to port P–1 of shuttle cylinder 24.

Directional valve 28 is a four-way valve, for illustration, and acceleration valves 41 and 42 are normally opened three-way valves.

Piped into the delivery lines 26 and 27 of valve 28 are the respective adjustable exhaust flow control valves 34 and 36. The delivery ports of acceleration control valves 41 and 42 are piped by suitable conduits to port P–1, for illustration, pressurizing the same with P–2 on the cylinder open to exhaust.

Operation

In FIG. 2 the system is also shown in a rest position with respect to mass 11, the piston 25 of main cylinder 24 being retracted. To operate, the directional valve 28 as well as acceleration valve 41 are simultaneously activated in an electrical control circuit with respective spools therein shifted so that AV2 feeds line pressure to flow control valve 36 whence it is bi-passed at 53 through open ball check valve 54 for full volume delivery through normally opened three-way acceleration valve 42 pressurizing port P–2.

The acceleration valve 41 as simultaneously activated moving its spool so that exhaust port P–1 is open to the atmosphere through passage 55.

The piston 25 and its connected mass 11 starts to accelerate in its rearward motion with no restriction as to exhaust flow from the cylinder. At a predetermined point in the movement of the mass, which may be a movable portion of the machine tool, and through the activation of a limit switch or other switch, acceleration control valve AV3 is deactivated and closes with the result that exhaust from P–1 now passes through the normally open acceleration valve 41 directly through flow control valve 34 for exhausting through AV2. The pressure built up behind piston 25 is now directed through AV3 to meter through flow control valve 34 and continues through AV2 exhausting through to atmosphere to thus absorb the excess kinetic energy bringing the moving mass to a smooth stop at the end of the stroke.

The point at which AV3 was closed, coupled with the adjustment of remote control valve 34, allows the adjustment of the system for a variety of mass loads.

At the end of the stroke the spool of four-way directional valve 28 is shifted to its normal position automatically. At the same time acceleration control valve 42 and the spool therein is shifted opening port P–2 to the atmosphere through passage 56.

AV2 is now supplying line pressure through unrestricted ball check 52 and through normally open three-way acceleration valve 41 to port P–1. The cylinder rod and its connectible mas is accelerating toward the rest position, FIG. 2. At the predetermined point, such as midway of the feed movement of shuttle cylinder 24, and through the action of a suitable limit switch or other switch AV4 solenold 47 is deactivated so that exhaust fluid from P–2 passes to flow control valve 36 and pressure is built up on piston 25 through the said choke valve or flow control valve 36. Ball check valve 54 is now closed. Thus, exhaust fluid is metered back through directional valve 28 for exhausting to the atmosphere. The metered pressure fluid through control 36 is now absorbing the excess kinetic energy to bring the mass to a smooth stop at the rest position corresponding to the end of the sroke of cylinder 24.

The circuit as shown in FIGS. 1 and 3 is in a normal rest position. By manually closing switch MS1 the coil circuit of relay switch CR1 is energized. Relay contact CR1–1 closes and contact CR1–2 opens. Contacts CR1 energize solenoid 30 of the directional valve 28 and through position cam switch A solenoid 44 of rear acceleration valve 41 is energized for full exhaust to atmosphere. At some preset position of the carriage, cam switch A opens de-energizing solenoid 44. This blocks the free exhaust through acceleration valve 41. The remaining air to exhaust is through directional valve 28 and exhaust choke valve 34, FIG. 1, to decelerate the carriage for a smooth stop.

Cam switch B is now closed. By opening manual switch MS1, FIG. 3, contacts CR1–1 opens and contacts CR1–2 closes. With cam switch B now closed solenoid 47 of forward acceleration valve 42 is activated and valve 42 is opened for free exhaust from port P4, at the same time the directional valve 28 has been de-activated or disengaged for normal exhauting through metering valve 36 whenever forward acceleration valve 42 is blocked. At some preset position cam switch B opens de-energizing solenoid 47 and blocking further exhaust through the forward acceleration valve 42. The remaining exhaust air now exhausts through the directional valve 28 and through choke valve 36 to bring the carriage to a smooth stop.

Having described our invention reference should now be had to the following claim.

We claim:

In a pneumatic control system including a source of air pressure, a cylinder and a reciprocal piston with piston rod attachable to a machine tool element for reciprocally feeding the same; the improvement comprising a directional valve connected to said source including a control spool for selectively delivering pressure fluid alternately to opposite ends of the cylinder and separate exhaust ports alternately receiving exhaust from opposite ends of the cylinder respectively;

an adjustable choke valve connected to each exhaust port for metered control of exhaust from both ends of the cylinder alternately;

an acceleration control valve connected to one end of said cylinder including a movable spool which in one position provides unrestricted exhaust bi-passing the choke valves providing maximum acceleration in one direction of said machine tool element, and in a second position cuts off said unrestricted exhaust, with said exhaust directed to said directional valve and one of said choke valves for controlled deceleration of said machine tool element bringing it to a smooth stop at the end of the cylinder stroke;

and a pneumatic circuit interconnecting said valves and cylinder;

and a second acceleration control valve in said circuit connected to the other end of said cylinder and including a movable spool which in one position provides unrestricted exhaust bi-passing the choke valves providing maximum acceleration in the opposite direction, and in a second position cuts off said unrestricted exhaust, with said exhaust directed to said directional valve and one of said choke valves for controlling deceleration of said machine tool element and for bringing it to a smooth stop at the end of the cylinder stroke, said first acceleration valve being a rear acceleration valve and said second acceleration valve being a forward acceleration valve, solenoids connected respectively to each valve spool, and remote control means connected with said solenoids for regulating movements of the respective control spools, said remote controls including switch means for simultaneously actuating said directional valve and one acceleration control valve for unrestricted cylinder exhaust, switch means for simultaneously reversing said directional valve and actuating the second acceleration control valve for unrestricted cylinder exhaust;

and independent means operably engaged on predetermined movement of said piston rod switch to selectively reverse said acceleration control valves respectively cuting off said unrestricted exhaust.

References Cited by the Examiner
UNITED STATES PATENTS

| | | | |
|---|---|---|---|
| 967,245 | 8/1910 | Rowntree | 91—407 |
| 1,023,267 | 4/1912 | Mock et al. | 91—407 |
| 2,397,814 | 4/1946 | Seborg et al. | 91—407 |
| 2,642,847 | 6/1953 | Roys | 91—407 |
| 2,753,849 | 7/1956 | Becker | 91—407 |
| 2,837,785 | 6/1958 | Happel | 91—407 |
| 2,867,192 | 1/1959 | Ettinger | 91—407 |

SAMUEL LEVINE, *Primary Examiner.*

FRED E. ENGELTHALER, *Examiner.*